(12) United States Patent
Hung

(10) Patent No.: US 8,410,944 B2
(45) Date of Patent: Apr. 2, 2013

(54) RADIATOR DETECTING DEVICE

(76) Inventor: Wen-Hui Hung, Taichung (TW)

( * ) Notice: Subject to any disclaimer, the term of this patent is extended or adjusted under 35 U.S.C. 154(b) by 330 days.

(21) Appl. No.: 12/949,266

(22) Filed: Nov. 18, 2010

(65) Prior Publication Data

US 2012/0126986 A1  May 24, 2012

(51) Int. Cl.
*G08B 17/00* (2006.01)
(52) U.S. Cl. .......... 340/584; 340/612; 340/618; 73/447; 73/453
(58) Field of Classification Search .......... 340/584, 340/679, 612, 614, 615, 618, 624, 686.1; 73/447, 453, 290 R
See application file for complete search history.

(56) References Cited

U.S. PATENT DOCUMENTS

| | | | | |
|---|---|---|---|---|
| 4,475,389 | A * | 10/1984 | Harris | 73/304 R |
| 5,045,836 | A * | 9/1991 | Nobles, Jr. | 340/450 |
| 5,656,771 | A * | 8/1997 | Beswick et al. | 73/114.68 |
| 5,741,069 | A * | 4/1998 | Egel | 374/146 |
| 6,967,572 | B1 * | 11/2005 | Oladeinde | 340/451 |

FOREIGN PATENT DOCUMENTS

| | | |
|---|---|---|
| TW | 494880 | 7/2002 |
| TW | M274526 | 9/2005 |
| TW | M300629 | 11/2006 |
| TW | M303129 | 12/2006 |

* cited by examiner

*Primary Examiner* — Toan N Pham
(74) *Attorney, Agent, or Firm* — Muncy, Geissler, Olds & Lowe, PLLC

(57) ABSTRACT

A radiator detecting device of the present invention includes a radiator cap, a sensing unit, a circuit device, a warning device, and an adjusting means. One end of the sensing unit connects to the radiator cap, and another end extends toward a direction away from the radiator cap. The circuit device has a circuit board. The circuit board includes a control circuit for detecting a state of the sensing unit, and the sensing unit selectively makes the control circuit generate a suggestion signal. Once receiving the suggestion signal generated by the control circuit, the warning device generates a warning signal. The adjusting means is used for adjusting a length of the sensing unit received in the radiator. Said sensing unit can be moved with respect to the radiator between a first position and a second position. Thereby, the sensing unit can fit different depths of different radiators.

5 Claims, 6 Drawing Sheets

RADIATOR DETECTING DEVICE

BACKGROUND OF THE INVENTION

1. Field of the Invention

The present invention relates to a radiator detecting device.

2. Description of the Prior Art

When a car is driven, the temperature of the car engine keeps rising. The engine will burn out once the temperature is too high. To avoid the above situation, cars are generally equipped with a water-cooling recycle system to decrease temperature and prevent the engine from overheating. However, the engine may burn out in the following conditions: the water temperature is too high, the cold water is insufficient, there is a leakage of the cold water, and other causes make the recycle system fail to cool down said engine.

Conventional radiators are equipped with a water-level sensor or a water-temperature sensor, and said radiators are connected to a warning device. The warning device generates a signal to warn drivers if a water level is too low or a water temperature is too high. Conventional water-level sensors, as shown in TWM303129 and TWM274526, are disposed on auxiliary radiators to monitor the water level of the radiators. Conventional water-temperature sensors, as shown in TW494880 and TWM300629, are disposed on radiator caps to allow drivers to check the water temperature of the radiators when opening the engine hoods. However, said conventional radiator detecting devices are not convenient and practical enough for drivers.

Therefore, the present invention is arisen to obviate or at least mitigate the above mentioned disadvantages.

SUMMARY OF THE INVENTION

The main object of the present invention is to provide a radiator detecting device which can be adjusted to fit different types of radiators.

To achieve the above and other objects, a radiator detecting device of the present invention includes a radiator cap, a sensing unit, a circuit device, a warning device, and an adjusting means.

The sensing unit includes a combining end and a sensing end. The combining end is connected to the radiator cap, and the sensing end extends toward a direction away from the radiator cap. The sensing end is received in the radiator when the radiator cap is covered on an opening of the radiator.

The circuit device includes a power connection device and a circuit board. The power connection device is used for connecting a power supply. The circuit board has a control circuit, which is electrically connected to the sensing unit. The control circuit is used for detecting a state of the sensing unit, so that the sensing unit can selectively make the control circuit generate a suggestion signal.

The warning device is electrically connected to the control circuit. Once the warning device receives the suggestion signal generated by the control circuit, the warning device generates a warning signal.

The adjusting means is used for adjusting a length of the sensing unit received in the radiator, so the sensing unit is movable with respect to the radiator cap between a first position and a second position. Thereby, the sensing unit can be adjusted to fit different depths of different radiators.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
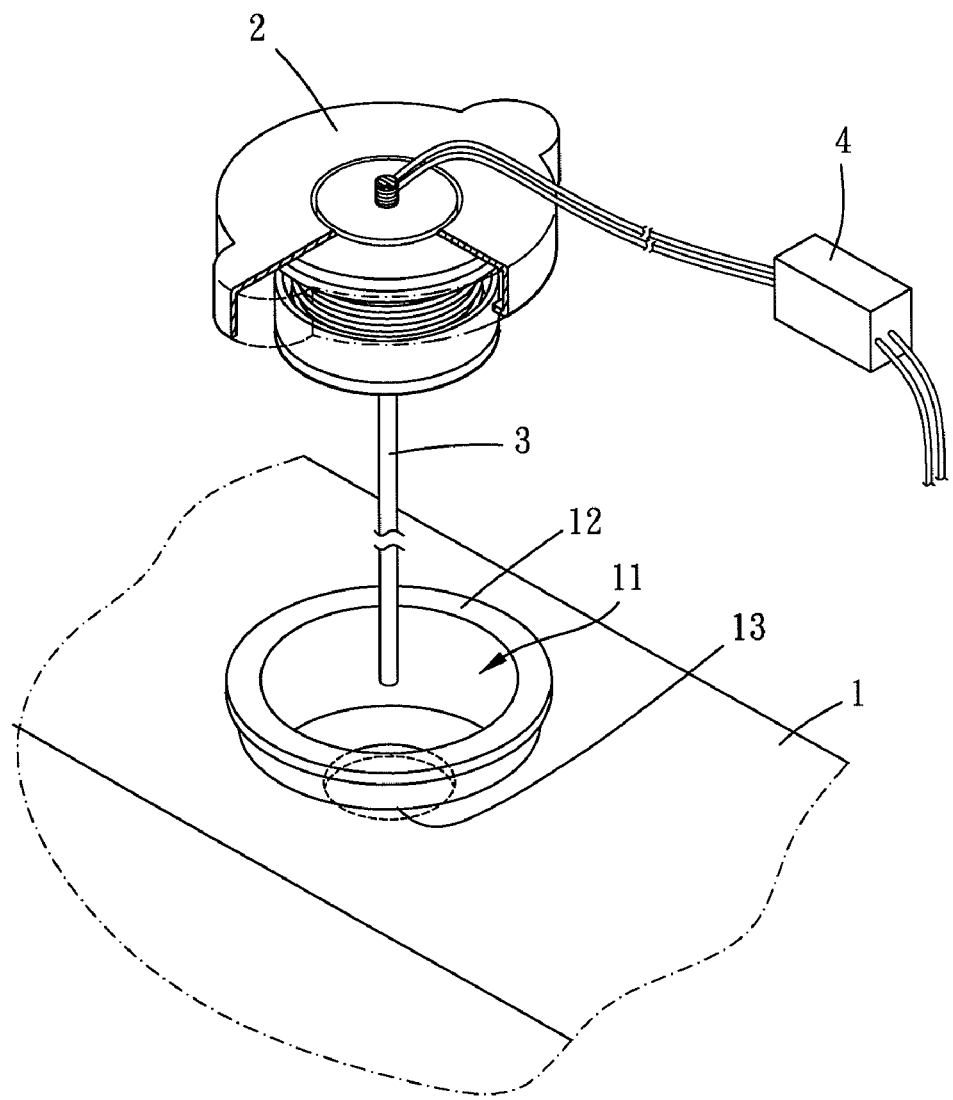
FIG. 1 is a stereogram showing a preferred embodiment in accordance with a radiator detecting device of the present invention.
Figure 2:
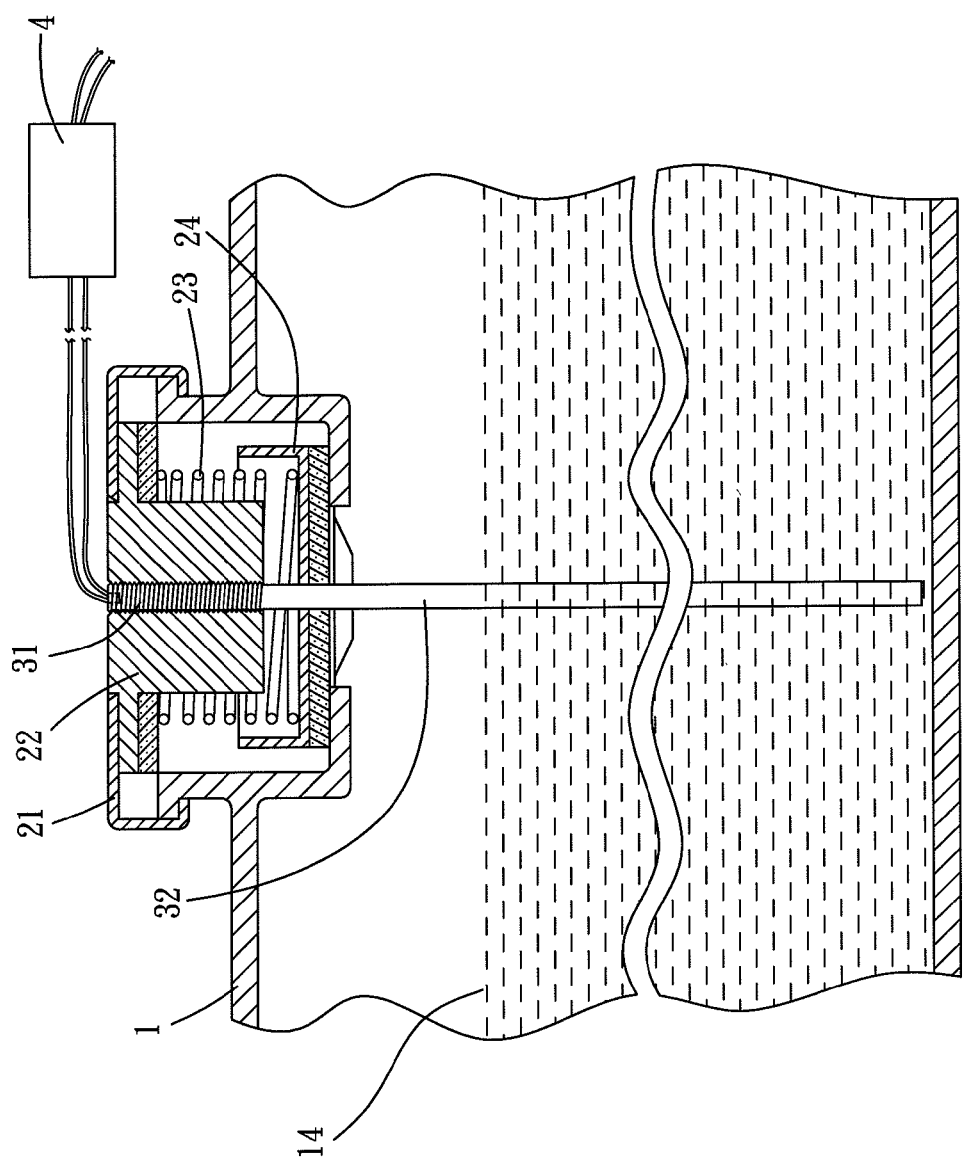
FIG. 2 is a cross-sectional drawing showing a first preferred embodiment in accordance with a radiator detecting device of the present invention, wherein the embodiment is disposed on a radiator having a deep depth and the sensing unit is at a first position.
Figure 6:
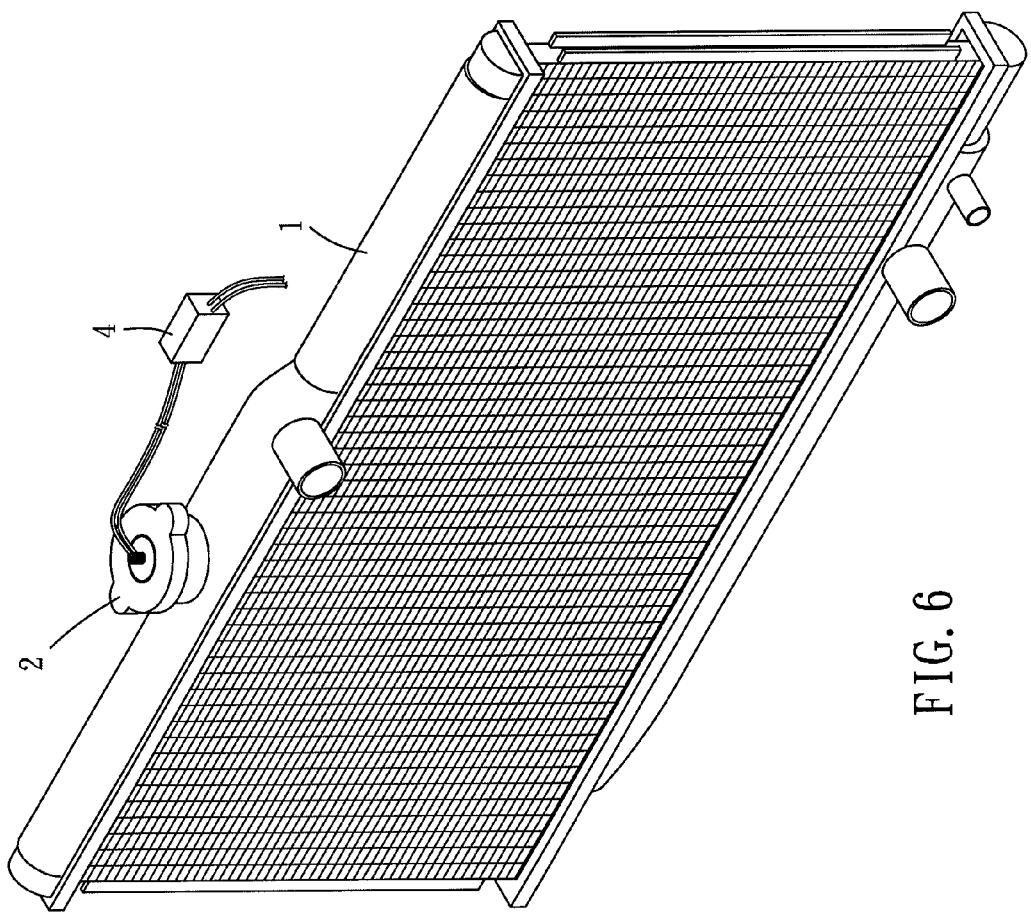
FIG. 6 is a schematic drawing showing a preferred embodiment in accordance with a radiator detecting device of the present invention, wherein the embodiment is combined with a radiator.

Please refer to FIG. 1, FIG. 2, and FIG. 6. A radiator detecting device of the first embodiment of the present invention is disposed on an opening of a radiator 1. More specifically, the radiator 1 has a receiving space 11, a first opening 12 and a second opening 13. A cold-water room 14 is defined in the radiator 1. The first opening 12 communicates with the receiving space 11 and an outer environment. The second opening 13 communicates with the receiving space 11 and the cold-water room 14. Further, the diameter of the first opening 12 is larger than the diameter of the second opening 13. The radiator detecting device includes a radiator cap 2, a sensing unit 3, a circuit device 4, a warning device, and an adjusting means.

The radiator cap 2 is received in the receiving space 11. The radiator cap 2 includes a top portion 21, a fixing portion 22, a spring 23, and a sealing portion 24. The top portion 21 can hermetically cover the first opening 12. One end of the fixing portion 22 is fixed with the top portion 21, and the other end of the fixing portions 22 extends toward the second opening 13. The spring 23 encircles the fixing portion 22. One end of the spring 23 abuts against the top portion 21, and the other end of the spring 23 abuts against the sealing portion 24. The spring 23 can provide a spring force to keep the radiator cap 2 having a certain pressed force, so that the sealing portion 24 can completely and hermetically cover the second opening 13.

The sensing unit 3 includes a combining end 31 and a sensing end 32. The combining end 31 is connected to the radiator cap 2. Perfectly, the combining end 31 is connected to the fixing portion 22. The sensing end 32 extends toward a direction away from the radiator cap 2. The sensing end 32 is received in the radiator 1 when the radiator cap 2 is covered on the opening of the radiator 1. More specifically, the sensing end 32 stretches into the cold-water room 14.

The circuit device 4 has a power connection device and a circuit board. The power connection device is used for connecting a power supply. The circuit board includes a control circuit, and the control circuit is electrically connected to the sensing unit 3. The control circuit is used for detecting a state of the sensing unit 3. The sensing unit 3 can selectively make the control circuit generate a suggestion signal.

The warning device (not shown) is electrically connected to the control circuit. The warning device generates a warning signal once it receives the suggestion signal generated by the control circuit. The warning device can be disposed in any position of a car, and perfectly, the warning device is fixed on a dashboard so that drivers can clearly notice the warning signal. The warning device can be designed as a bulb, a led, or other lighting devices. Moreover, said warning device can also be designed as a buzzer, a speaker, or other voicing devices, or even the combination of the lighting devices and the voicing devices.

Figure 4:
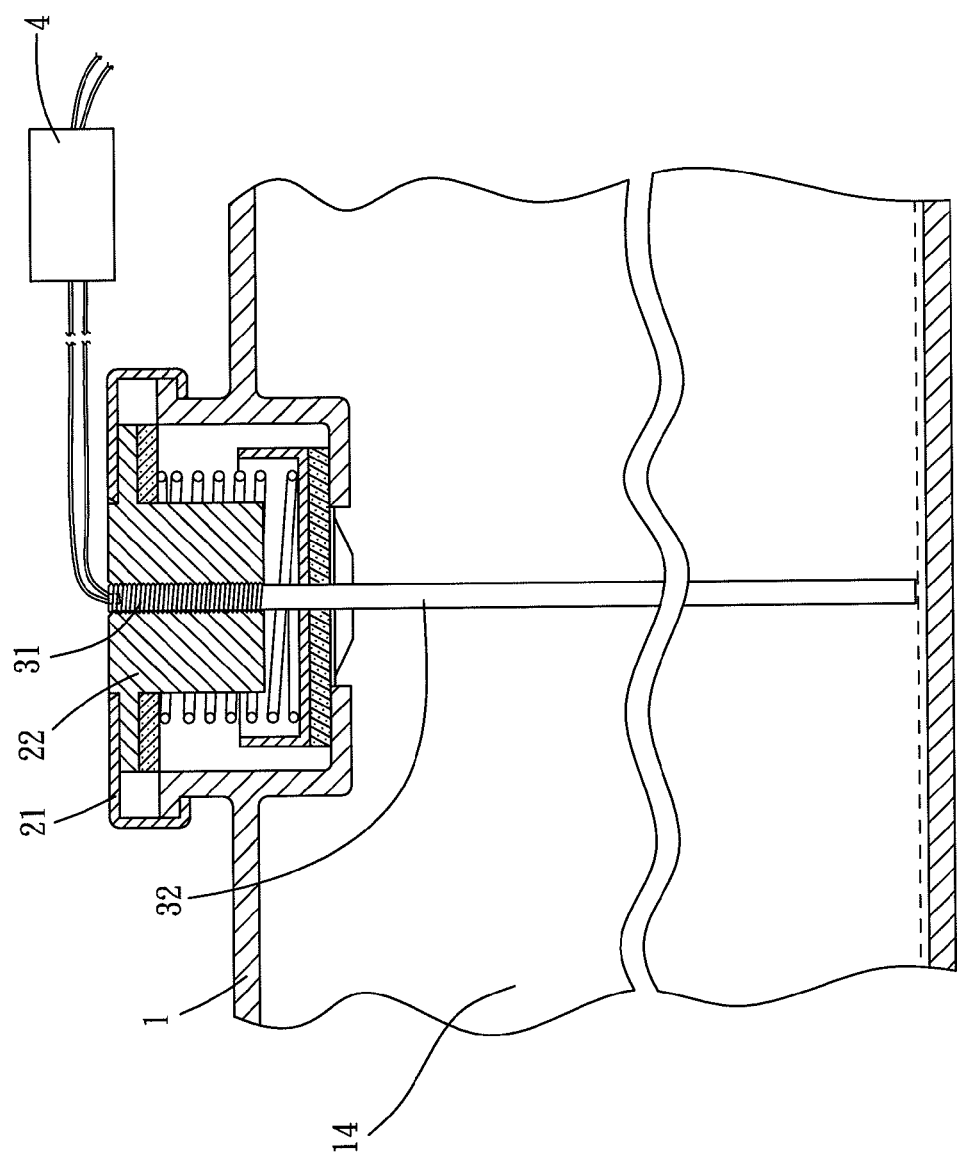
FIG. 4 is a schematic drawing showing a first preferred embodiment in accordance with a radiator detecting device of the present invention, wherein the embodiment detects the lack of cold water.

The sensing unit 3 is a conducting device, and the radiator 1 has a metal portion which is electrically connected to the control circuit. Please refer to the FIG. 2. When the cold water in the cold-water room 14 is sufficient, the sensing end 32 can contact the cold water so as to make the conducting device in a conduction state. Please refer to the FIG. 4. When the cold water is insufficient, the sensing end 32 cannot contact the cold water. In that condition, the control circuit will detect an off state of the conducting device and simultaneously generate a suggestion signal. Once the suggestion signal is passed to the warning device, said warning device will generate a warning signal to warn drivers that the cold water is insufficient.

The sensing unit can also be a water-temperature sensor. When temperature of the cold water is too high, said sensor will send a signal to the control circuit to make the control circuit generate and pass a suggestion signal to the warning device. Thereby, the warning device can generate a warning signal to warn drivers that the cold-water temperature is too high.

Figure 3:
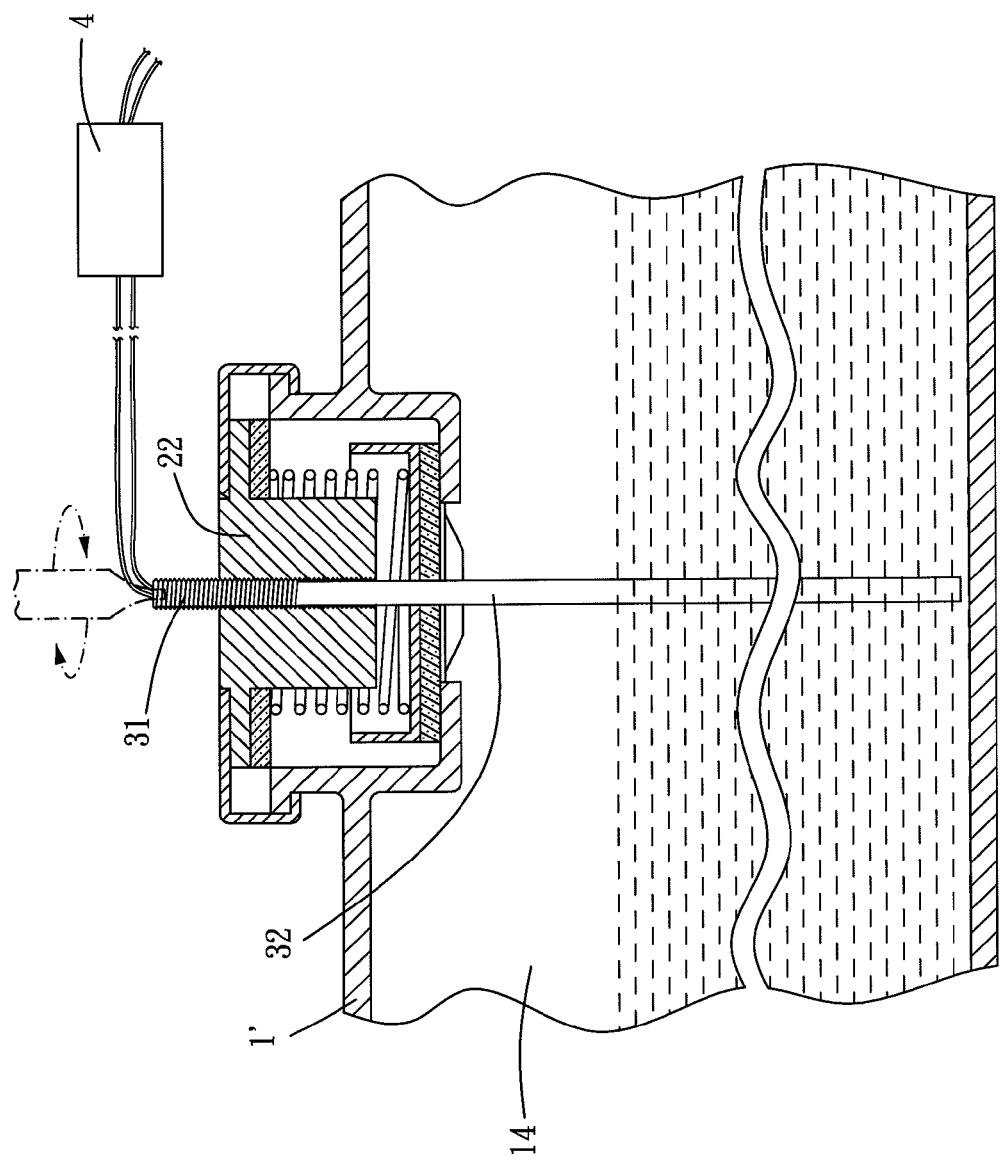
FIG. 3 is a cross-sectional drawing showing a first preferred embodiment in accordance with a radiator detecting device of the present invention, wherein the embodiment is disposed on a radiator having a shallow depth and the sensing unit is at a second position.

The adjusting means is for adjusting a length of the sensing unit 3 received in the radiator, and the sensing unit 3 is movable with respect to the radiator cap 2 between a first position and a second position. Please refer to FIG. 2 to FIG. 4. In the first embodiment, the combining end 31 and the fixing portion 22 have a corresponding thread section respectively, so that the combining end 31 is screwed to the fixing portion 22. More specifically, the sensing unit 3 can be movably screwed into the fixing portion 22 between the first position and the second position. In this way, the sensing unit 3 can be adjusted to fit different depths of different cold-water rooms 14. As shown in FIG. 2, the radiator detecting device is disposed on a radiator 1 having a deep depth, wherein the sensing unit 3 is located in a first position. As shown in FIG. 3, the radiator detecting device is disposed on a radiator 1' having a shallow depth, wherein the sensing unit 3 is located in a second position. Thereby, the radiator detecting device is available for different types of radiators.

Figure 5:
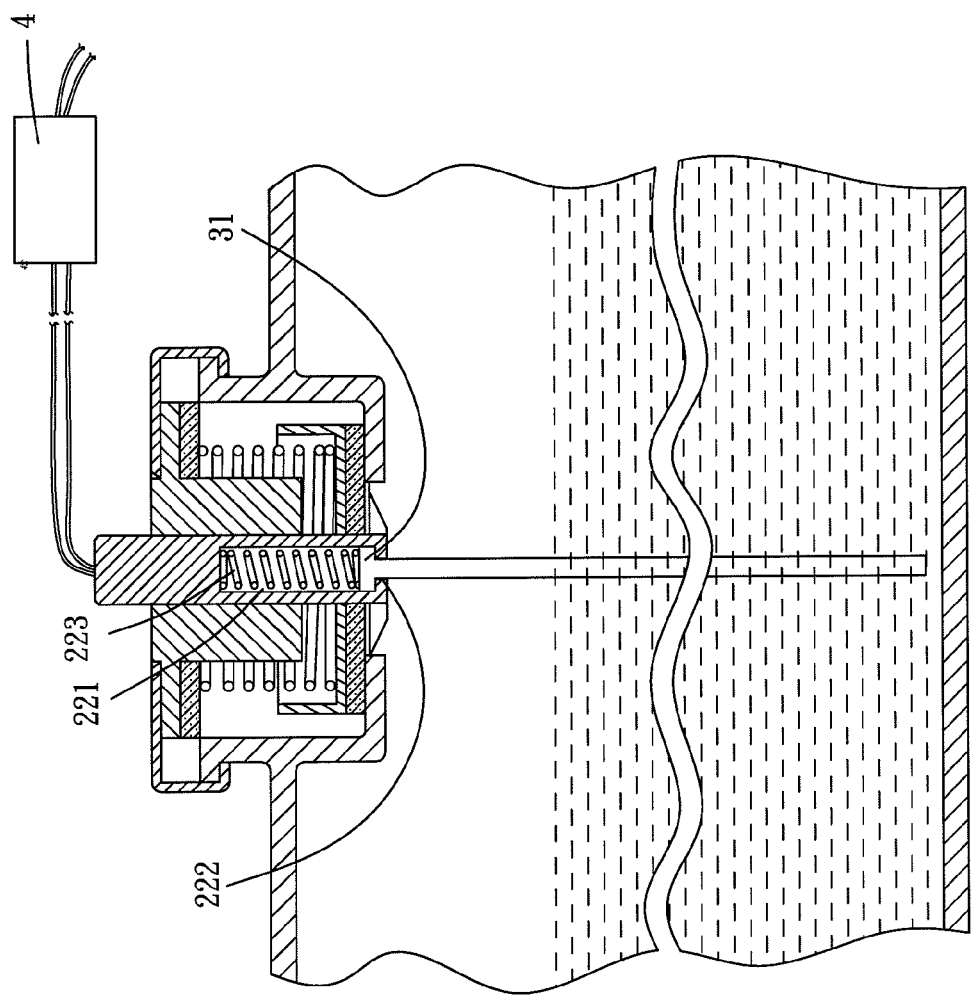
FIG. 5 is a cross-sectional drawing showing a second preferred embodiment in accordance with a radiator detecting device of the present invention.

Please refer to FIG. 5. The second embodiment of the present invention provides another adjusting means. The difference between the first and the second embodiment is that a room 221 and a hole 222 are defined in the fixing portion 22. The hole 222 communicates with the room 221. The fixing portion 22 has a spring 223. The spring 223 is received in the room 221. The combining end 31 penetrates into the room 221 through the hole 222. One end of the spring 223 abuts against the combining end 31. The other end of the spring 223 abuts against the top of the room 221. The sensing unit 3 with the spring 223 can be resiliently movable between a first position and a second position.

What is claimed is:

1. A radiator detecting device, which is disposed on an opening of a radiator, comprising:
    a radiator cap;
    a sensing unit, comprising a combining end and a sensing end, the combining end being connected to the radiator cap, the sensing end extending toward a direction away from the radiator cap, the sensing end being received in the radiator when the opening of the radiator is covered by the radiator cap;
    an adjusting means for adjusting a length of the sensing unit received in the radiator, the sensing unit being movable with respect to the radiator cap between a first position and a second position;
    a circuit device, comprising a power connection device and a circuit board, the power connection device being adapted to connect a power supply, the circuit board comprising a control circuit, the control circuit being electrically connected to the sensing unit, the control circuit being adapted to detect a state of the sensing unit, the sensing unit selectively making the control circuit generate a suggestion signal;
    an warning device, connecting electrically to the control circuit, the warning device generating a warning signal when receiving the suggestion signal from the control circuit.

2. The radiator detecting device of claim 1, wherein the radiator cap comprises a fixing portion, the combining end and the fixing portion comprise a corresponding thread section respectively, so that the combining end is screwed with the fixing portion.

3. The radiator detecting device of claim 1, wherein the radiator cap comprises a fixing portion, a room and a hole are defined in the fixing portion, the hole and the room communicate with each other, the fixing portion further comprises a spring, the spring is received in the room, the combining end penetrates into the room through the hole, one end of the spring abuts against the combining end, and another end of the spring abuts against the top of the room.

4. The radiator detecting device of claim 1, wherein the sensing unit is a conducting device, the radiator comprises a metal portion, and the control circuit connects electrically to the metal portion.

5. The radiator detecting device of claim 1, wherein the sensing unit is a water-temperature sensor.

* * * * *